Patented Oct. 7, 1941

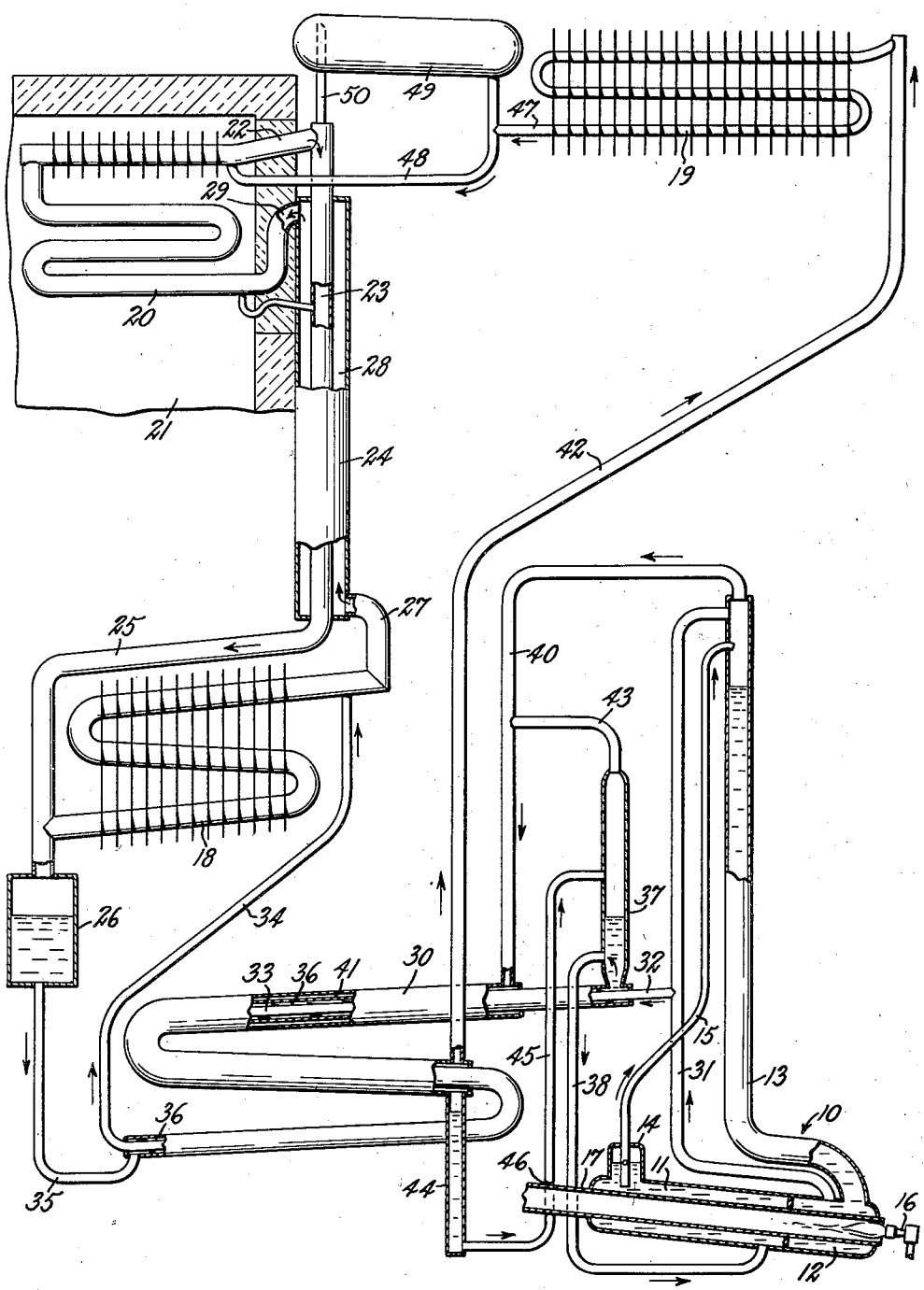

2,257,874

UNITED STATES PATENT OFFICE 2,257,874

REFRIGERATION

Hugo M. Ullstrand, Evansville, Ind., assignor to Servel, Inc., New York, N. Y., a corporation of Delaware Application January 4, 1938, Serial No. 183,256

14 Claims. (Cl. 62—119.5)

My invention relates to an absorption type refrigeration system and it is an object of the invention to provide a system of this type having greater efficiency.

The single figure of the drawing shows more or less diagrammatically an absorption refrigeration system of a type making use of an auxiliary pressure equalizing fluid. A generator 10 comprises a horizontal portion divided into chambers 11 and 12 and an upright portion or standpipe 13. The lower end of standpipe 13 is connected to chamber 12. Chamber 11 is provided with a dome 14. A riser or vapor liquid lift conduit 15 is connected from chamber 11 to the upper part of standpipe 13. The lower end of conduit 15 extends downward through the dome 14 into chamber 11. The generator is heated by a gas burner 16 arranged so that the flame is projected into the lower end of a flue 17 which extends through the horizontal portion of the generator.

An absorber 18 comprises a pipe coil provided with heat transfer fins for cooling by air. A condenser 19 also comprises a pipe coil provided with heat radiation fins. An evaporator 20 comprises a pipe coil located in a thermally insulated refrigerator compartment 21.

The upper end of evaporator 20 is connected by a conduit 22, inner passage 23 of a gas heat exchanger 24, and conduit 25 to the lower end of absorber 18 and the upper part of a vessel 26, referred to as an absorber sump or vessel. The upper part of absorber 18 is connected by a conduit 27, the outer passage 28 of gas heat exchanger 24, and a conduit 29 to the lower end of evaporator 20.

The generator 10 and absorber 18 are interconnected by members including a triple heat exchanger 30. Chamber 12 of generator 10 is connected by a conduit 31, a conduit 32, the inner passage 33 of heat exchanger 30, and conduit 34 to the upper end of absorber 18. The lower end of absorber 18 is connected by a conduit 25 to the upper part of absorber vessel 26. The lower part of absorber vessel 26 is connected by a conduit 35, a middle passage 36 of heat exchanger 30, a vessel 37, and conduit 38 to chamber 11 of generator 10. The upper end of conduit 31 is connected to the upper end of the standpipe 13.

The upper end of standpipe 13 is connected to the upper end of condenser 19 by a conduit 40, the outside passage 41 of heat exchanger 30, and conduit 42. The upper end of vessel 37 is connected by a conduit 43 to vapor conduit 40. The lower end of outside pipe 41 of heat exchanger 30 is connected to the upper part of vessel 37 by a sump conduit 44 and a vapor liquid lift conduit 45. The lower part of conduit 45 is arranged in thermal contact with the generator flue 17 at 46.

The lower end of condenser 19 is connected by a conduit 47 and a conduit 48 to the upper end of evaporator 20. One end of conduit 48 is connected to the lower part of a vessel 49. The upper part of vessel 49 is connected by a conduit 50 to the inner passage 23 of gas heat exchanger 24.

The system contains a suitable refrigerant such as ammonia, a liquid absorbent such as water, and an auxiliary pressure equalizing fluid such as hydrogen. These fluids may be introduced into the system through a suitable charging connection, not shown, in the absorber vessel 26. In charging, a water solution of ammonia of a concentration of about 30% by weight is introduced into the system up to the level of the charging plug. The hydrogen is introduced into the system at a pressure such that the total pressure in the system will be the condensing pressure of ammonia at a fairly high room temperature. As is shown, the absorber 18 and condenser 19 are directly cooled by air. The absorber and condenser may be otherwise cooled, as by circulating water or a vaporization-condensation heat transfer circuit. Instead of a gas burner 16, other suitable means may be used for heating the generator, such as an electric heating element or a liquid fuel burner. The heater for the generator may be controlled by a thermostat responsive to a temperature condition affected by the evaporator 20.

In operation, heat applied to the generator 10 by the burner 16 causes expulsion of ammonia vapor out of solution. Vapors expelled from solution in chamber 11 accumulate in dome 14 and rise through conduit 15 causing upward flow of liquid through this conduit by vapor liquid lift action into the upper end of standpipe 13. Vapors expelled from solution in chamber 12 and standpipe 13 rise through liquid to the upper end of the standpipe. Vapors flow from the upper end of standpipe 13 through previously described connections to the upper end of condenser 19.

Ammonia vapor condenses to liquid in condenser 19 and flows into the upper end of evaporator 20. Liquid ammonia flows downward in evaporator 20, evaporating and diffusing into hydrogen, producing a refrigerating effect. The mixture of hydrogen gas and ammonia vapor, referred to as rich or strong gas, flows from the upper end of evaporator 20 through the previously described connections to the lower end of absorber 18.

Weakened absorption liquid, referred to as weak solution, flows from generator chamber 12 through the previously described connections to the upper end of absorber 18. Weak solution flows downward in absorber 18, absorbing ammonia vapor out of the rich gas. The resulting weak gas, sometimes referred to as poor gas, returns through the previously described connections to the lower end of the evaporator 20. Enriched absorption liquid, referred to as strong or rich solution, flows from the lower end of the absorber 18 into absorber vessel 26 and thence through the previously described connections to chamber 11 of the generator 10.

Vessel 49 may be referred to as a pressure vessel or hydrogen storage vessel. This vessel contains a quantity of hydrogen, the auxiliary fluid, which is displaced through conduit 50 into the gas circuit to cause increase in the partial pressure of hydrogen in this circuit upon increase in total pressure in the system under high room temperature conditions, as known.

Weak solution flowing through inner passage 33 of the heat exchanger 30 gives up heat to strong solution flowing in the opposite direction in middle passage 36 of the heat exchanger 30, so that the weak solution is cooled by the heat transferred to strong solution and returned thereby to the generator to effect conservation of this heat. Vapors from the generator flowing in outside passage 41 of heat exchanger 30 also give up heat to strong solution flowing in the opposite direction in middle passage 36. Transfer of heat from the vapors is accompanied by condensation in the outside passage 41. This condensation effects removal of water vapor accompanying ammonia vapor from the generator and is referred to as rectification. In accordance with this invention, the heat of rectification is not dissipated but is conserved, that is, returned to the generator. The latent heat of condensation is transferred to the strong solution and returned thereby to the generator. The condensate with its sensible heat is also returned to the generator. The condensate flows downward in the outside heat exchanger passage 41 into conduit 44 and conduit 45. The lower part of conduit 45 is heated at 46 where it is in contact with the generator flue 17. Any ammonia which may be condensed in the outside passage 41 also flows into conduits 44 and 45. Vapors formed in the lower part of conduit 45 by heating of the liquid rise through conduit 45 into vessel 37, causing upward flow of liquid through conduit 45 by vapor lift action whereby condensate from the outside passage 41 of the heat exchanger 30 is raised into the vessel 37. In vessel 37, the condensate joins rich solution and is returned therewith through conduit 38 to the generator chamber 11.

Circulation of the gas through and between the evaporator 20 and absorber 18 is caused in a known manner by difference in specific weights of the rich and weak gas. The described flow of weak solution from the generator to the absorber occurs by gravity. The surface level of liquid in standpipe 13 is high enough so that liquid overflows from the upper end of conduit 34 into the upper end of absorber 18. The described flow of strong solution takes place by vapor liquid lift action in conduit 15. Strong solution stands in absorber vessel 26 and vessel 37 at substantially the same levels which are sufficiently above the lower end of conduit 15 so that the column of vapor and liquid formed in conduit 15 extends to the upper end of this conduit and overflows into the upper end of standpipe 13.

The triple heat exchanger 30 is located below the surface levels of liquid in the generator and absorber so that the liquid passages thereof are flooded with weak and strong solution flowing in opposite directions. It is therefore necessary to raise the condensate formed in outside passage 41 above the surface level of liquid in the system to keep the passage 41 free for flow of vapor and return the condensate into the liquid circuit. This is accomplished by the auxiliary vapor liquid lift or thermosyphon provided by sump conduit 44 and conduit 45 through which condensate is raised into vessel 37 above the surface level of strong solution therein.

Various changes and modifications may be made within the scope of the invention which is not limited except as indicated in the following claims.

What is claimed is:

1. A method of refrigeration which includes expelling refrigerant from absorption liquid at a place of heating, liquefying the expelled refrigerant, evaporating the liquefied refrigerant in the presence of an inert auxiliary fluid for equalizing pressure, absorbing evaporated refrigerant out of said auxiliary fluid into absorption liquid at a place of absorption, circulating said absorption liquid through and between said place of absorption and said place of heating, flowing at the same level vapors and liquid from said place of heating and liquid to said place of heating in heat transfer relation out of physical contact at a place of heat exchange to cause rectification by condensation of vaporous absorption liquid and conservation of heat by return thereof in the liquid flowing to said place of heating, draining the resultant condensate by gravity flow to a level below said place of heat exchange, and utilizing heat to cause said condensate independently of said circulating absorption liquid to rise above said place of heat exchange in a path of flow returning to said place of heating for conservation of the sensible heat in the condensate.

2. An absorption refrigeration system having a circuit for absorption liquid including a generator, an absorber, and a triple heat exchanger, said exchanger being connected to conduct vapors and liquid from the generator and liquid flowing to the generator in heat transfer relation out of physical contact with each other, said exchanger also being located at a level below the surface levels of liquid in both said generator and said absorber, and means outside of said circuit for absorption liquid for receiving condensate from the vapor conducting portion of said exchanger and raising the condensate above said exchanger for return to said generator.

3. Absorption refrigeration apparatus having a circuit for absorption liquid including a generator, an absorber, and a triple heat exchanger, said exchanger being connected to conduct at the same level vapors and liquid from said generator and liquid flowing to said generator in heat transfer relation out of physical contact with each other, vapor lift means for causing flow of liquid in said circuit, and means for conducting condensate by gravity from the vapor portion of said triple heat exchanger and lifting said condensate into said liquid circuit.

4. A method of refrigeration which includes the steps of expelling refrigerant vapor from an absorption liquid at a place of heating, liquefying the expelled refrigerant, evaporating the liquefied refrigerant, absorbing the evaporated refrigerant into absorption liquid, carrying out said steps concurrently, bringing into heat transfer relation out of physical contact vapor flowing from said place of heating and absorption liquid flowing to said place of heating, whereby the vapor is rectified by condensation of vaporous absorption liquid accompanying the refrigerant vapor and the latent heat of rectification is conserved by transfer to the absorption liquid flowing to said place of heating, causing said flow of absorption liquid by a method which includes maintaining a column of liquid, carrying out said heat transfer at a level below the upper end of said liquid column, draining by gravity flow condensate resulting from said rectification out of the presence of rectified vapor and raising said condensate independently of said flow of absorption liquid to a level above said place of heat exchange and thence conducting the condensate to said place of heating for conservation of the sensible heat in the condensate.

5. A method of refrigeration as set forth in claim 4 which also includes flowing absorption liquid from said place of heating in heat transfer relation with said absorption liquid flowing to the place of heating.

6. A method of refrigeration as set forth in claim 4 which also includes flowing absorption liquid from said place of heating in heat transfer relation with absorption liquid flowing to said place of heating, and causing said vapor and said absorption liquid flowing from said place of heating to move counter-current to said absorption liquid flowing to said place of heating.

7. A method of refrigeration as set forth in claim 4 in which said condensate is raised above said place of heat transfer by vapor lift action.

8. A method of refrigeration as set forth in claim 4 which also includes raising said condensate above said place of heat transfer by vapor lift action, and forming vapor for said action by heating liquid with unused heat from said place of heating.

9. A method of refrigeration as set forth in claim 4 in which said liquid column is maintained by vapor lift action.

10. A method of refrigeration which includes generating refrigerant vapor from solution in absorption liquid at a place of vapor expulsion, condensing expelled refrigerant vapor to liquid at a place of condensation, evaporating the condensed refrigerant liquid to produce refrigeration, absorbing evaporated refrigerant fluid into absorption liquid in a place of absorption, conducting absorption liquid by gravity flow in both directions between said place of absorption and said place of vapor expulsion, conducting vapor from said place of expulsion toward said place of condensation in heat transfer relation out of physical contact with absorption liquid flowing toward said place of expulsion, whereby the vapor is rectified by condensation of vaporous absorption liquid accompanying the refrigerant vapor and the latent heat of rectification is conserved by transfer to the absorption liquid flowing to said place of vapor expulsion, and causing the condensate resulting from said rectification to drain away from the vapor under action of gravity and then rise independently of said flow of absorption liquid against the action of gravity in a path of flow returning to said place of expulsion for conservation of the sensible heat in the condensate.

11. An absorption refrigeration system containing pressure equalizing fluid, refrigerant fluid, and liquid absorbent for the refrigerant fluid, and having a heater for causing expulsion of refrigerant vapor from absorption liquid, a heat exchanger connected in the system to conduct in heat transfer relation out of physical contact absorption liquid flowing toward said heater and expelled refrigerant vapor flowing away from said heater, whereby the vapor is rectified by condensation of vaporous absorption liquid accompanying the refrigerant vapor and the latent heat of rectification is conserved by transfer to the absorption liquid flowing toward said heater, means utilizing a force reacting against a column of liquid to cause said flow of absorption liquid, said heat exchanger being located at a level below the upper end of said liquid column, means to drain condensate by gravity flow from said heat exchanger, and means to raise said condensate to a level above the upper end of said column for flow toward said heater so that the sensible heat in the condensate is conserved.

12. A refrigeration system as set forth in claim 11 in which said condensate raising means includes a vapor-liquid lift.

13. A refrigeration system as set forth in claim 11 also having means for conducting liquid in a path of flow away from said heater through said heat exchanger in heat transfer relation with liquid flowing toward said heater.

14. A refrigeration system as set forth in claim 11 having a vapor liquid lift for maintaining said liquid column.

HUGO M. ULLSTRAND.